United States Patent [19]
Scholl et al.

[11] 4,273,567
[45] Jun. 16, 1981

[54] METHOD AND APPARATUS FOR FORMING GLASS PARISONS

[75] Inventors: John J. Scholl, Elmira; Warren D. Staley, Painted Post, both of N.Y.

[73] Assignee: Corning Glass Works, Corning, N.Y.

[21] Appl. No.: 120,352

[22] Filed: Feb. 11, 1980

[51] Int. Cl.³ .............................................. C03B 11/16
[52] U.S. Cl. ........................................ 65/72; 65/68; 65/226; 65/305; 65/317
[58] Field of Search ...................... 65/68, 72, 226, 305, 65/308, 317

[56] References Cited

U.S. PATENT DOCUMENTS

| | | | |
|---|---|---|---|
| 2,263,126 | 11/1941 | Gray et al. | 65/225 X |
| 2,576,191 | 11/1951 | Pond | 65/243 X |
| 3,329,492 | 7/1967 | Kinsley | 65/226 X |
| 3,334,985 | 8/1967 | Lippmann et al. | 65/308 X |
| 3,598,560 | 8/1971 | Sundstrom et al. | 65/306 X |
| 3,622,305 | 11/1971 | Becker | 65/229 |
| 3,690,527 | 9/1972 | Bustraan | 65/176 X |

OTHER PUBLICATIONS

Tooley, Handbook of Glass Manufacture, vol. I; Ogden Publishing Company; New York, N.Y.; 1953; pp. 326-339.

Primary Examiner—Richard V. Fisher
Attorney, Agent, or Firm—Burton R. Turner

[57] ABSTRACT

A single mold and plunger set is programmed to form a parison within each of a plurality of neck rings which are continuously successively presented along a linear path. The mold, which is positioned below the linear path of said continuously successively presented neck rings, receives a charge of molten glass and accelerates in a direction parallel to said linear path to a speed commensurate with that of the continuously presented neck rings, and upon tracking with a particular neck ring, such mold moves vertically into engagement with a bottom portion thereof. Simultaneously, the plunger, which is positioned above said linear path, accelerates in a direction parallel with the movement of said continuously presented neck rings to a speed commensurate therewith, and upon tracking said particular neck ring moves vertically into engagement with an upper portion thereof so as to press form the charge of molten glass deposited within the mold into a shape determined by the shape of the parison mold and plunger. The mold and plunger then retract from said particular neck ring, which retains the parison therein, and return to the starting position to repeat the cycle so that a parison may be press formed in the next succeeding neck ring.

41 Claims, 8 Drawing Figures

METHOD AND APPARATUS FOR FORMING GLASS PARISONS

BACKGROUND OF THE INVENTION

This invention relates to the art of forming glass articles from molten glass, and more particularly to the forming of a plurality of virtually identical parisons or blanks by a single mold and plunger set, within a plurality of neck ring retainers continuously moving along a given linear path.

In the past, it has been known to form parisons for press and blow operations by conventional means such as the Hartford I.S. machine, the Miller press and blow machine and the Lynch MB machine. The Hartford I.S. machine utilizes a plurality of blank molds, each with its own plunger, blowhead and neck ring. With the mold, plunger and neck ring in position, a charge is received in the mold and blown down so that the plunger forms the finish in the neck ring. After a counter blow, the parison is completely formed and the blank mold opened with the glass parison held by the neck ring which is then rotated 180° in a vertical plane to a position over a closing blow mold, wherein the neck ring is opened to release the parison into the blow mold and is then rotated back into position with the mold and plunger for a repeat cycle.

Both the Miller press and blow machine and the Lynch MB machine utilize rotating tables having a plurality of molds thereon for forming the parison, wherein the tables are rotated with an intermittent or cyclic movement such that molds stop at each station. Whereas the Miller press and blow machine uses one plunger for forming the blank and transfers the same by use of a neck ring, the Lynch MB machine utilizes individual plungers for each mold and transfers the parison from a blank mold table to a blow mold table by means of a swing transfer mechanism. A more complete explanation of the operation of the Hartford I.S. machine, the Miller press and blow machine and the Lynch MB machine is set forth on pages 326-339 of *HANDBOOK OF GLASS MANUFACTURE* VOL. I by Fay V. Tooley. However, from the foregoing it can be seen that the devices of the prior art not only functioned on an intermittent or cyclic basis in the production of parisons, but also required a plurality of mold and plunger sets so as to be available at each station and yet only productive at the pressing station.

U.S. Pat. No. 3,622,305 discloses a more recent concept in press and blow machines wherein a plurality of parisons are press formed by a plurality of mold and plunger sets as they rotate about a blank mold table. In U.S. Pat. Nos. 3,598,560 and 3,690,527, a plurality of continuously moving neck rings are mated with a plurality of continuously moving plunger type blowheads positioned thereabove and a plurality of continuously moving parison molds positioned therebelow. Although the parisons of the foregoing apparatus are formed in a continuously moving neck ring, such apparatus still requires the redundancy of multiple mold sets. U.S. Pat. Nos. 2,263,126 and 2,576,191, while utilizing only one mold set to consecutively form glass parisons, the parisons are not formed along a linear path or within the neck rings successively presented along such a path.

The present invention, however, discloses method and apparatus for successively forming parisons with a single mold and plunger set along a linear path and within successively presented neck rings continuously traveling along such path.

It thus has been an object of the present invention to improve upon the known technology of delivering and forming molten glass into parisons while minimizing the required number of mold sets and facilitating the handling of the newly formed parisons.

SUMMARY OF THE INVENTION

In its very simplest form, the present invention relates to method and apparatus for repeatably and successively forming a plurality of parisons within continuously successively presented neck rings while moving along a linear path, with the utilization of a single mold set comprising a mold and plunger, and utilizing the successively presented neck rings for retaining and conveying the newly formed parisons.

DESCRIPTION OF THE PREFERRED EMBODIMENTS

Figure 1:
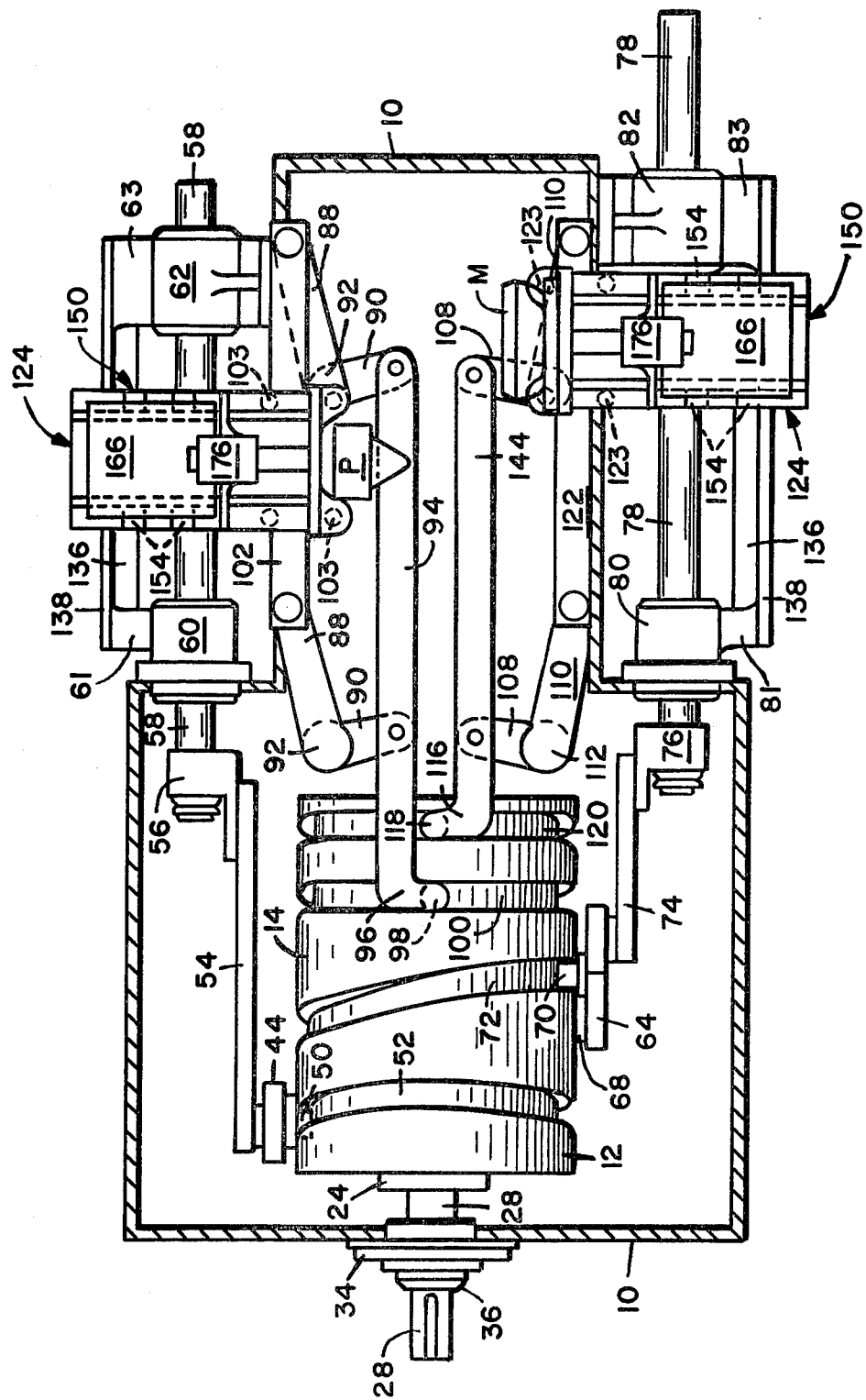
FIG. 1 is a schematic side elevational view of apparatus embodying the present invention.
Figure 2:
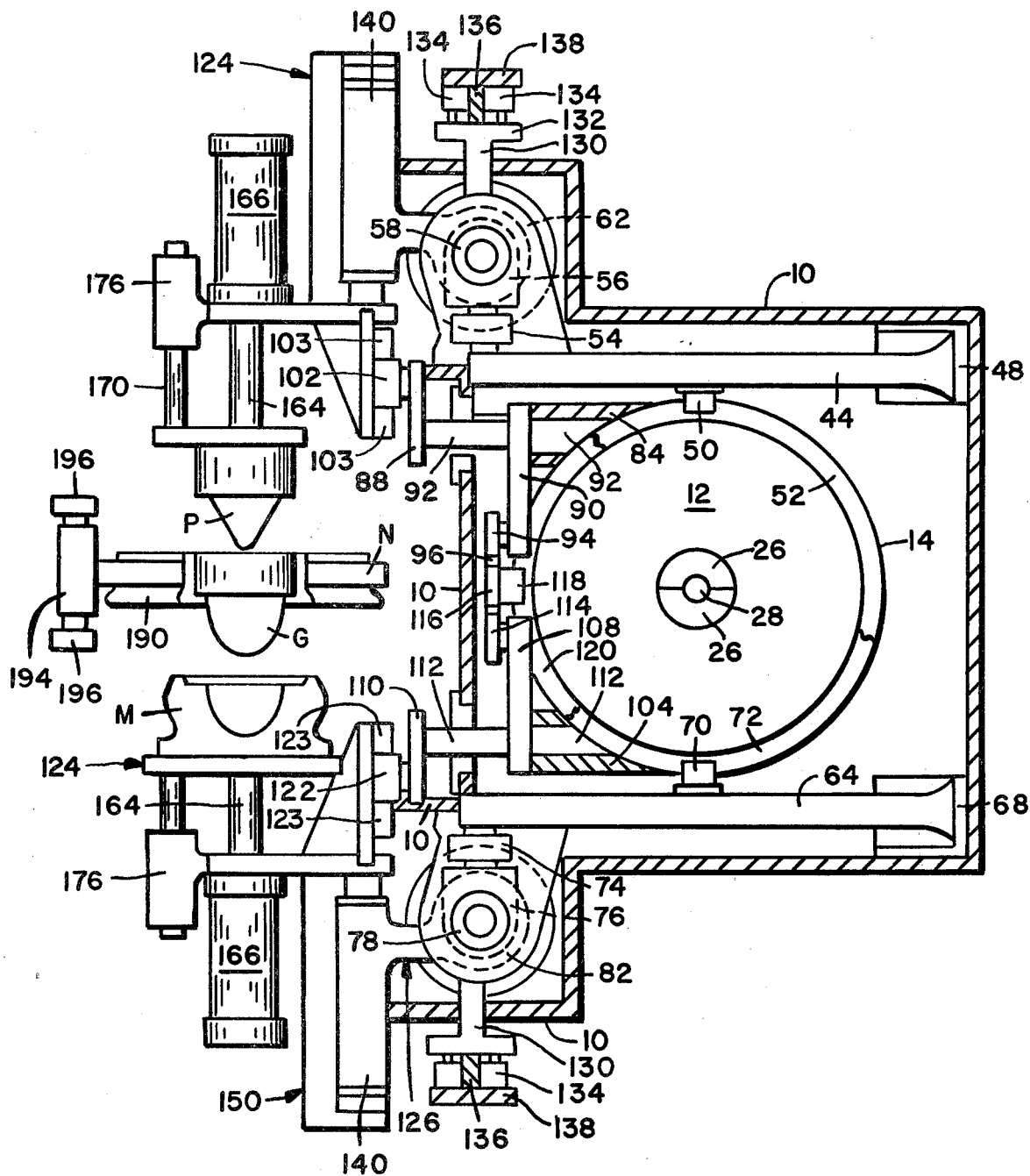
FIG. 2 is a schematic end elevational view of the apparatus shown in FIG. 1.
Figure 3:
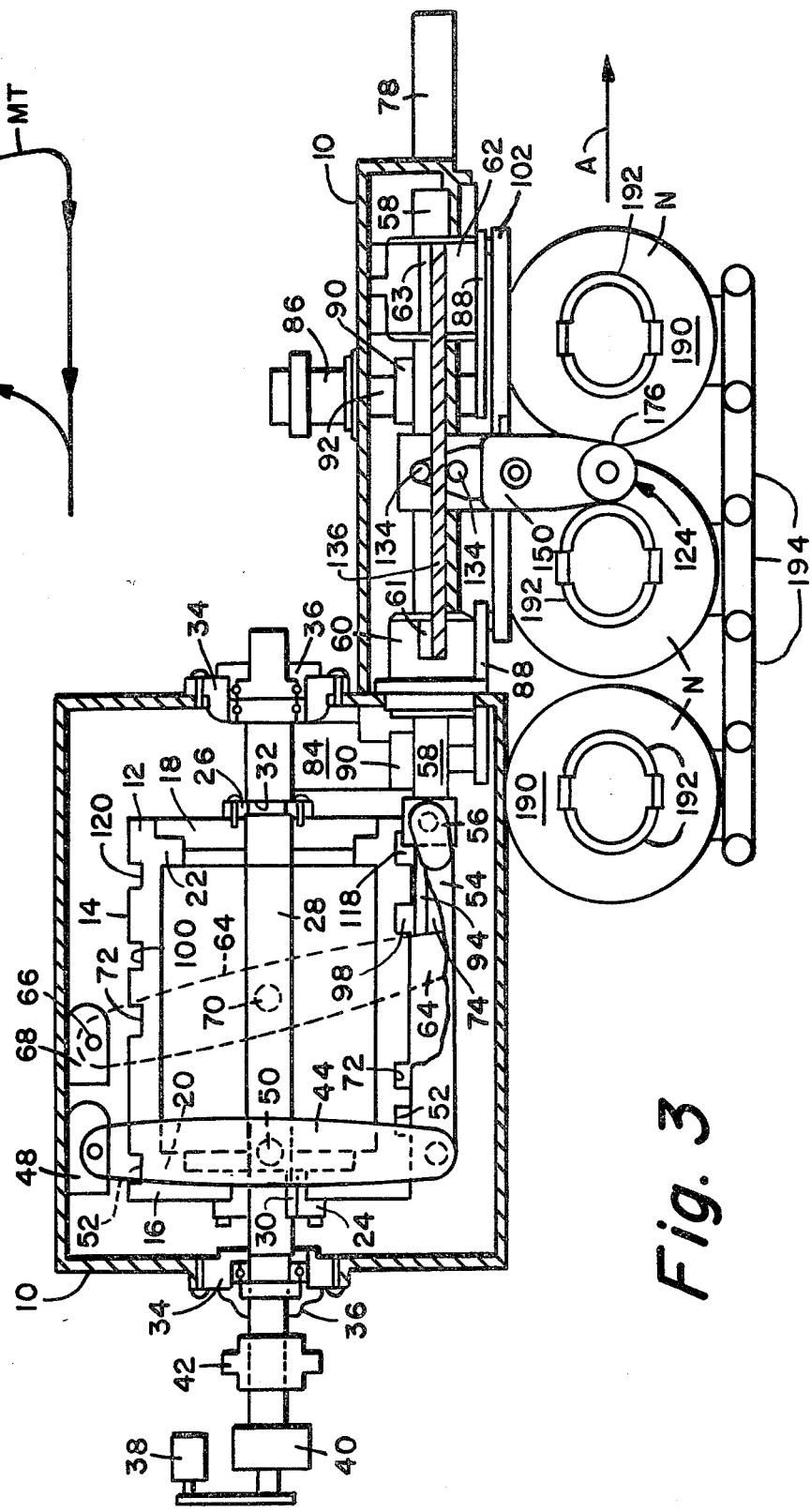
FIG. 3 is a schematic top plan view of the apparatus shown in FIG. 1.
Figure 4:
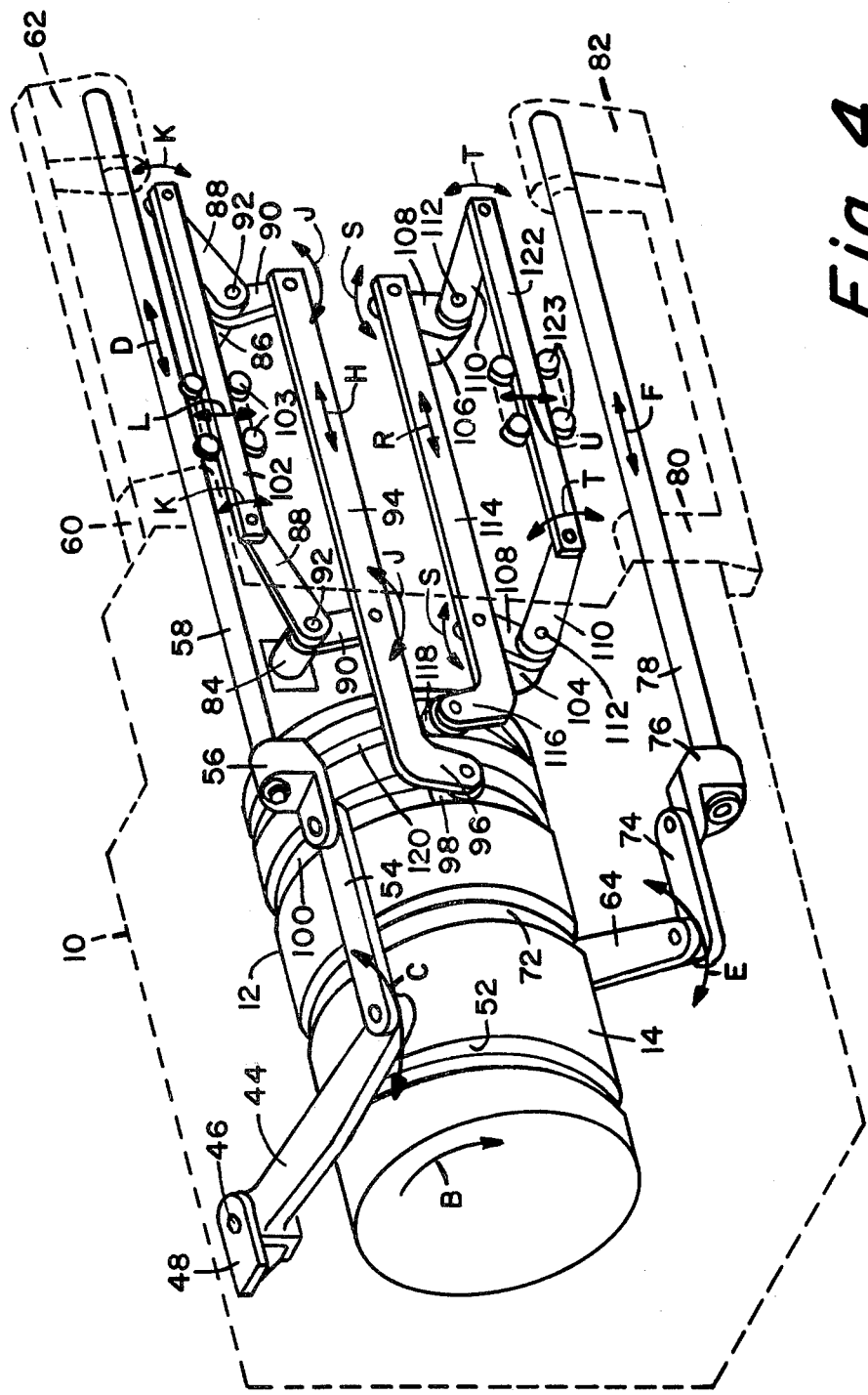
FIG. 4 is a perspective schematic view illustrating the various movements accomplished by the apparatus shown in FIGS. 1-3.

Referring now to the drawings, and particularly FIGS. 1 through 3, apparatus embodying the present invention is shown including a support housing 10 enclosing a timing drum cam or cylindrical cam member 12 which, through various connecting levers and mechanisms coordinates the horizontal and vertical movement of a plunger P and mold M with respect to the successive presentation of a plurality of neck rings N along a linear path as designated by arrow A (FIG. 3). Referring now to FIG. 4 in conjunction with FIGS. 1 through 3, it can be seen that the timing drum cam 12 is in the form of a cylindrical cam member having a plurality of four cam tracks formed in the outer periphery of the drum such that each cam track is longitudinally spaced apart from an adjacent track and is continuous about the circumference of the drum.

As shown particularly in FIG. 3, the drum 12 may have an outer cylindrical cam surface portion 14 and a pair of disc-like end plates 16,18 bolted to inwardly projecting peripheral flange portions 20,22, respectively at opposite longitudinal ends of said cylindrical cam portion 14. The drum 12 is secured by means of a flanged hub 24 and split clamping rings 26 to an axle 28 for rotation about a horizontal axis. The flanged hub 24 is bolted to end plate 16 about its flange portion and splined to the axle 28 at 30 so as to rotate in unison therewith. The split clamping rings 26 are positioned within a recess 32 formed in the axle 28 and are bolted to end plate 18 so as to longitudinally position the drum 12 on the axle. The axle 28 rotates in bearing housings 34 provided with suitable sealing caps 36 formed in opposite ends of the support housing 10. The timing drum cam 12 may be driven by any suitable means such as a variable drive electric motor 38 connected to a speed reducing mechanism 40 having an output connected by coupler 42 to the axle 28.

Referring now to FIG. 4, the timing drum cam 12 is shown by arrow B as rotating in a clockwise direction about a horizontal axis. An upper or first cam follower arm 44 is pivotally mounted to an upper bracket 48 secured to a wall of the support housing 10 about a vertical axial pin 46. As shown also in FIG. 1, the upper cam follower arm 44 has a first cam follower 50 rotatably secured thereto which projects downwardly within a first cam track 52 formed in the outer cylindrical cam surface portion 14 of the timing drum cam 12. As will be shown, the first cam track 52 is in fact the cam track which times and synchronizes the horizontal motion of the plunger with respect to its vertical motion and the horizontal and vertical motion of the mold. As shown, the first cam follower arm 44 is pivotally connected to one end of a connector arm 54 which is pivotally connected at its opposite end to an L-shaped clamping member 56 which securely clamps one end of an upper horizontal slide rod 58. The slide rod 58 is journaled for sliding movement within axially aligned bushing housings 60,62 secured to the support housing 10. As shown in FIG. 4, cam track 52 and cam follower 50 cause first cam follower arm 44 to pivot about vertical axial pin 46 in an arc represented by arrow C in such a manner so that connector arm 54 causes upper horizontal slide rod 58 to reciprocate within bushing housings 60,62 in a linear horizontal path represented by arrow D.

A lower or second cam follower arm 64 is pivotally mounted by a vertical axial pin 66 within a lower bracket 68 secured to support housing 10. A second cam follower 70 is rotatably mounted on second cam follower arm 64 intermediate its ends for positionment within a second cam track 72 formed circumferentially about the outer cylindrical cam surface portion 14 of the timing drum cam 12. As will be seen, the second cam track 72 functions to time and synchronize the horizontal movement of the mold with respect to its vertical movement and the vertical and horizontal movement of the plunger. The second cam follower arm 64 is pivoted at its outer end to one end of a connecting link 74 which is pivotally mounted at its opposite end to an L-shaped clamping member 76. The clamping member 76 is securely clamped to one end of a lower horizontal slide rod 78 which is slidably retained in axially aligned bushing housings 80,82 attached to the support housing 10. As shown in FIG. 4, the second cam track 72 causes the second cam follower arm 64 to pivot about vertical axial pin 66 through an arc represented by arrow E, which through connecting link 74 and clamping member 76 causes lower horizontal slide rod 78 to reciprocate back and forth in a linear path such as shown by arrow F.

A pair of upper spindle housings 84,86, secured to support housing 10 in horizontal alignment, each have an upper crank arm 88 and a lower crank arm 90, each fixedly secured to a spindle 92 rotatably positioned within upper spindle housings 84 and 86, such that arms 88 and 90 effectively function as bell cranks. The lower ends of such bell crank arms 90 are pivotally connected to an upper horizontal operating arm 94 having a downwardly offset cam follower mounting portion 96 rotatably mounting a third cam follower 98, which rides within a third cam track 100 formed circumferentially about the outer cylindrical cam surface portion 14 of the timing drum cam 12. The upper outer ends of upper crank arms 88 are pivotally connected to end portions of an upper horizontal lift bar 102 which, as described hereinafter, provides vertical movement to the plunger P.

Thus, the third cam track 100 functions to time and coordinate the vertical movement of the plunger P with its horizontal movement as defined by cam track 52 and the vertical and horizontal movement of the mold M. That is, as the drum 12 rotates, the third cam follower 98 within third cam track 100 will cause upper horizontal operating arm 94 to essentially move back and forth as shown by arrow H, however in view of the fact that the arm 94 is pivotally connected to the lower outer ends of crank arms 90 which pivot with spindle 92, the actual motion produced in upper arm 94 is shown by arrows J. Further, in view of the fact that upper crank arms 88 and lower crank arms 90 are fixedly secured to the spindle 92, with each set functioning as a bell crank, the pivotal motion imparted to crank arms 90 by upper operating arm 94 is transmitted to upper horizontal lift bar 102 through upper crank arms 88 with an oscillating motion indicated by arrows K. Although the crank arms 88 impart a somewhat arcuate upward movement to the upper lift bar 102, since the plunger mounting mechanism is free to move horizontally with respect to upper bar 102 by means of rollers 103, the motion which is actually transmitted to the plunger by the horizontal lift bar 102 is in the vertical direction as represented by arrow L. Further, it will be noted that even though the motion imparted to upper horizontal operating arm 94 and upper horizontal lift bar 102 by the crank arms 88 and 90 follows an oscillating arcuate path, both arm 94 and bar 102 remain horizontal during their path of travel.

A pair of lower spindle housings 104,106, horizontally aligned with each other, are mounted on support housing 10 vertically below upper spindle housings 84,86, respectively. Each lower spindle housing 104,106 has an upper crank arm 108 and a lower crank arm 110 fixedly mounted onto a spindle 112 which is pivotally mounted within each of said housings 104,106. The outer upper ends of upper crank arms 108 are pivotally connected to a lower horizontal operating arm 114 having an upwardly offset cam follower mounting portion 116 pivotally mounting a fourth cam follower 118 which rides within a fourth cam track 120 formed circumferentially in the outer cylindrical cam surface portion 14 of the timing drum cam 12. The fourth cam track 120 times and coordinates the vertical movement of the mold M with respect to its horizontal movement as programmed by second cam track 72 and the vertical and horizontal movements of the plunger P as programmed by third and first cam tracks 100 and 52, respectively. The lower outer ends of lower crank arms 110 are pivotally connected to end portions of a lower horizontal lift bar 122.

As the timing drum cam 12 rotates, cam follower 118 within cam track 120 causes the lower horizontal operating arm 114 to move back and forth substantially in the direction of the arrow R; however, due to the pivoting of upper crank arms 108 the actual motion imparted to arm 114 is shown by arrows S. Further, in view of the fact that upper crank arms 108 and lower crank arms 110 are securely attached to spindles 112 which rotate within the housings 104 and 106, such that the arms 108 and 112 function as a bell crank, lower horizontal lift bar 122 is provided with an oscillating motion as shown by arrows T. However, in view of the fact that the mold mounting mechanism is free to move horizontally by means of rollers 123 along the bar 122, the motion imparted to the mold mechanism by lift bar 122 is a vertical motion as shown by arrow U. Like upper operating arm 94 and upper horizontal lift bar 102, lower operating arm 114 and lower horizontal lift bar 122 remain horizontal and parallel to one another during the movement imparted by crank arms 108 and 112.

As shown particularly in FIGS. 2 and 3, first and second cam followers 50 and 70, which ride within first and second cam tracks 52 and 72, respectively and which impart the horizontal motion to upper horizontal slide rod 58 and lower horizontal slide rod 78, lie substantially within a vertical plane passing through the horizontal axis of the timing drum cam 12, such that the end points of the reciprocal travel along cam 12 of cam followers 50 and 70 lie within such vertical plane passing through the axis of the drum 12. Likewise, as more particularly shown in FIGS. 1 and 4, third and fourth cam followers 98,118 which respectively ride within third and fourth cam tracks 100 and 120, and which program the vertical movement of upper and lower lift bars 102 and 122, substantially lie within a horizontal plane passing through the longitudinal axis of the timing drum cam 12, such that the end points of the reciprocal travel of cam followers 98 and 118 longitudinally of the drum 12 lie within such horizontal plane passing through the axis of the drum cam.

Figure 7:
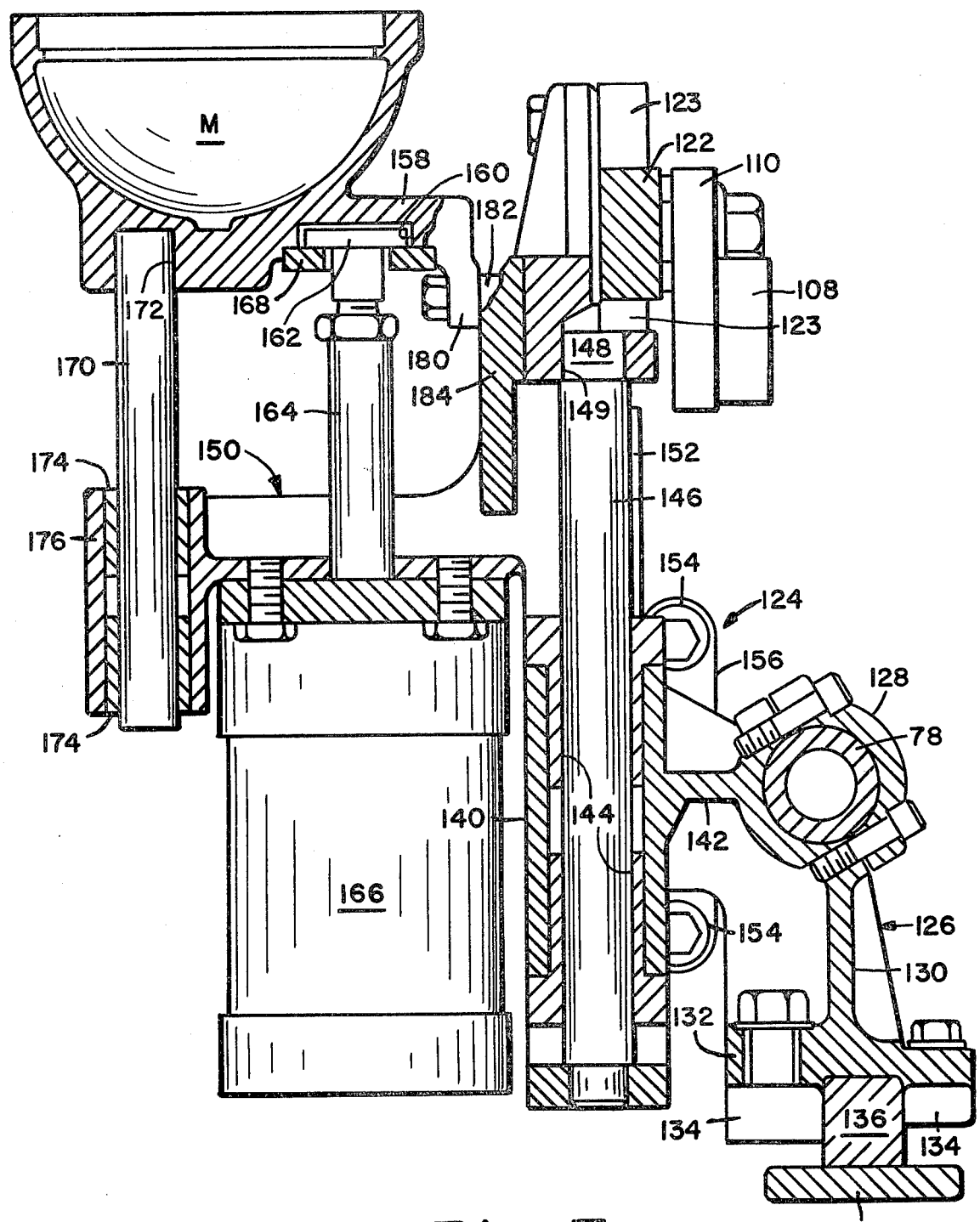
FIG. 7 is an elevational view partially in section of the mold mounting apparatus which facilitates vertical movement.

Referring now to FIG. 7 in conjunction with FIGS. 1, 2 and 3, the slide mounting mechanism 124 for the mold M and the plunger P will not be described. In view of the fact that the mounting means 124 for both the mold and the plunger are identical, with the exception that one is inverted with respect to the other, only the mechanism with respect to the mold will be described in detail. A support bracket 126 is securely clamped to horizontal slide rode 78 for horizontal movement therewith by means of a split clamp 128. The support bracket 126 has a vertically extending portion 130 which, at its distal end 132, has a pair of rollers 134 mounted thereon for roller guiding engagement with a guide bar 136. The guide bar 136 and stiffener bar 138 are secured to flange portions 81,83 of bushing housings 80,82 respectively (and to flange portions 61,63 of bushing housings 60,62 respectively).

Support bracket 126 also positions a slide housing 140 by means of a horizontal portion 142. The slide housing 140 has bushings 144 for slidably housing a rod 146 for vertical movement therewithin. An upper end portion 148 of the rod 146 is fixedly secured within a recess 149 of a slide carriage member 150. The slide carriage 150 has rollers 123 mounted at its upper end for rolling engagement with the horizontal lift bar 122. Thus, as the horizontal slide bar 78 is moved in a horizontal direction by cam track 72 (and slide bar 58 moved horizontally by cam track 52), the slide mounting mechanism, including support bracket 126 and slide carriage 150, is moved simultaneously therewith in view of split clamp 128, with rollers 123 tracking along horizontal lift bar 122 (and rollers 103 tracking along lift bar 102), and rollers 134 guidably tracking along guide bar 136. As cam track 120 functions to move horizontal lift bar 122 in a vertical direction, the slide carriage 150 is simultaneously moved in a vertical direction with rod 146 sliding in vertical movement within slide housing 140. In order to prevent the slide carriage 150 from pivoting about the rod 146, the carriage is provided with a pair of roller plates or tracks 152 mounted on opposite sides thereof, with each track 152 being engaged by a pair of rollers 154 rotatably mounted on plates 156 secured to opposite sides of slide housing 140. Thus, as cam track 72 or 52 moves the mounting means 124 horizontally with slide rod 78 or 58, cam track 120 or 100 moves the carriage member 150 vertically by means of lift bar 122 or 102, respectively.

In order to avoid catastrophic results should a malfunction occur in the loading and/or pressing operations, the mold and plunger are mounted on the slide carriage 150 for relative vertical movement with respect thereto upon reaching a predetermined force, whereby such movement functions as a safety valve should such a malfunction occur. Referring again to FIG. 7, the mold support 158 is shown having a recess 160 provided with an operating head 162 of a cylinder rod 164 of an air cylinder 166 mounted on the slide carriage member 150. As noted, the operating head 162 is provided with a degree of clearance within the recess 160 and retained in place by a retaining ring 168. Further, a guide rod 170 is fixedly positioned within a further recess 172 formed in the mold support 158 and is slidably received within bushings 174 retained within a boss 176 formed on the slide carriage 150. A flange 180 projecting downwardly from the support 158 retains a pair of rollers 182 positioned on opposite sides of a guide bar 184 secured to carriage 150. The air cylinder 166 is supplied with a predetermined amount of pressure to retain the mold M and plunger P with predetermined positionments for normal pressing operations. However, should a malfunction occur and excessive forces be applied to the mold or plunger, the support 158 will react against the cylinder rod 164 to retract the same allowing the mold to move vertically with guide rod 170 sliding within bushings 174 of boss 176 and rollers 182 guiding the downward movement along guide bar 184. Further, the space within recess 160 prevents the jamming of the sliding movement should there be a slight skewing effect.

Figure 6A:
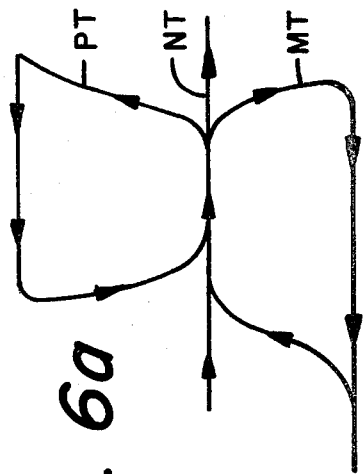
FIG. 6a is a schematic illustration of the cyclical paths of travel followed by the mold and plunger.

Referring now to FIG. 6a, the paths of travel of the mold and plunger with respect to the neck ring are shown, with the mold track designated as MT, the plunger track designated as PT and the linear portion of the neck ring track designated as NT. The paths are set forth schematically in an elevational view since the mold and plunger operate in a single common vertical plane through which the neck ring passes along a linear path. Although not forming a part of the present invention, as shown particularly in FIGS. 2 and 3, the neck ring assembly N which retains and conveys the newly formed glass parison G includes a plurality of adjacent or sequentially presented neck ring or retention means 190 each having split neck rings 192 which are openable and closable therewithin. The plurality of neck ring means 190 are shown being connected together by links 194 and provided with rollers 196 for movement along adjacent tracks. For a further detailed description of a preferred embodiment of such neck ring assemblies which may be utilized with the present invention, see copending patent application entitled "Neck Ring Mechanism", Ser. No. 120,330, filed on even date.

Figure 5:
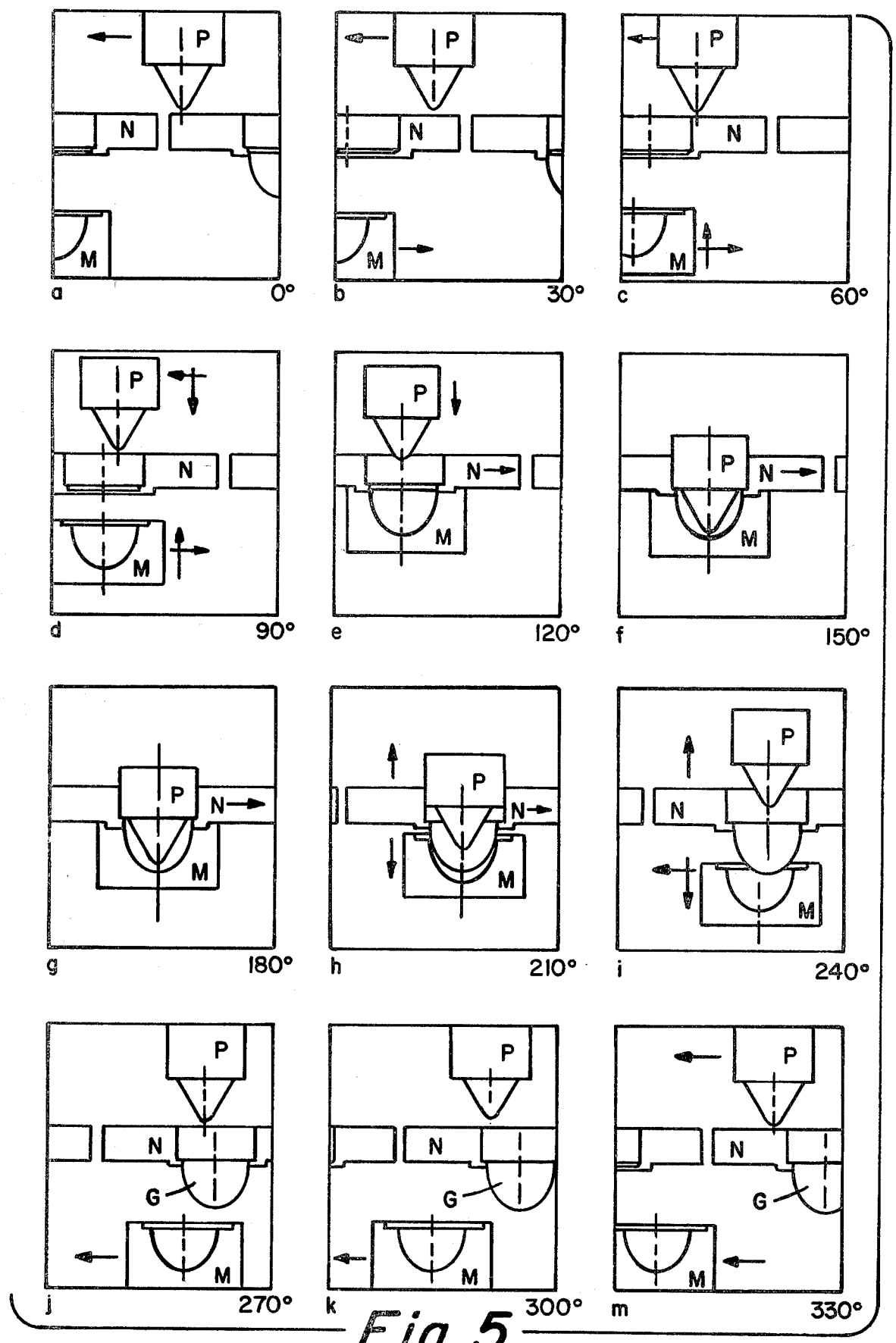
FIG. 5 is a plurality of successive schematic illustrations showing the operation of the single mold and plunger set with respect to the successively presented neck rings.

Referring now to the timing chart shown in FIG. 6 and the schematic illustrations of various positionments shown in FIG. 5, the movement of the mold M and the plunger P in response to the operation of the cam tracks 52, 72, 100 and 120 of timing drum cam 12 as it rotates through 360°, will now be described. Beginning with an arbitrary 0° position, it will be noted that the mold M is in a down position ready for loading and remains in such loading position until 25°, wherein it begins to accelerate to catch up to the next presented neck ring N which is moving horizontally at a predetermined speed along a linear path within the vertical plane of operation of the mold and plunger. In the meantime, the plunger P is in the up position between 0° and 75° and is returning to a starting position up to about 91°. Thus, FIG. 5a, representing the 0° position, illustrates the mold in the down loading position and the plunger in the up return position, whereas FIG. 5b, illustrating the 30° position, shows the mold in the down position accelerating to catch up to the neck ring whereas the plunger is still at an up returning position. Accordingly, the first cam track 52 is operating to retract upper horizontal slide rod 58 and accordingly plunger P, while simultaneously second cam track 72 is operating to extend slide rod 78 and mold M forwardly.

At the 60° position as shown in FIG. 5c, the plunger is continuing its return movement while in the up position, whereas the mold while continuing its horizontal acceleration also is moving upwardly through the action of fourth cam track 120 and lower lift bar 122 raising slide carriage 150 and accordingly the mold M. Comparing FIG. 6 with FIG. 5d, it will be seen that at the 90° position the plunger, while continuing its return travel, is beginning to move downwardly through the action of third cam track 100 and upper lift bar 102 acting upon slide carriage 150 carrying the plunger P, whereas the mold had caught up to the speed of the neck ring so as to track the same while continuing its upward movement.

Referring again to FIG. 6, in conjunction with FIG. 4, it can be seen that between 75° and 135°, the third cam track 100, through upper horizontal operating arm 94, crank arms 88,90, upper horizontal lift bar 102 and slide carriage 150 move plunger P from its up position to a down position for pressing, and that between about 91° and 105°, first cam track 52, through first cam follower arm 44, connector arm 54, clamping member 56, upper horizontal slide rod 58, and support bracket 126 accelerate the plunger horizontally from a plunger return motion to a speed equivalent to that of the neck ring so as to track horizontally therewith. The mold, on the other hand, at 75° has reached the tracking speed of the neck ring and tracks the same to 225°, and also reaches its up position in engagement with the neck ring at 105°, remaining in such up position for pressing to 195°.

With reference to FIG. 5e, which represents the 120° position, it can be seen that the mold M is in the up position in engagement with the neck ring N and is tracking with the same, whereas the plunger, while tracking with the neck ring, is moving downwardly through the action of third cam track 100 and upper lift bar 102. With respect to FIG. 5f, which shows the 150° position and FIG. 5g, which shows the 180° position, it will be noted that both the mold and plunger are in their pressing positions in engagement with the neck ring, and are simultaneously tracking at the same speed thereof by means of first and second cam tracks 52 and 72 through the operation of upper and lower slide rods 58 and 78 respectively.

Figure 6:
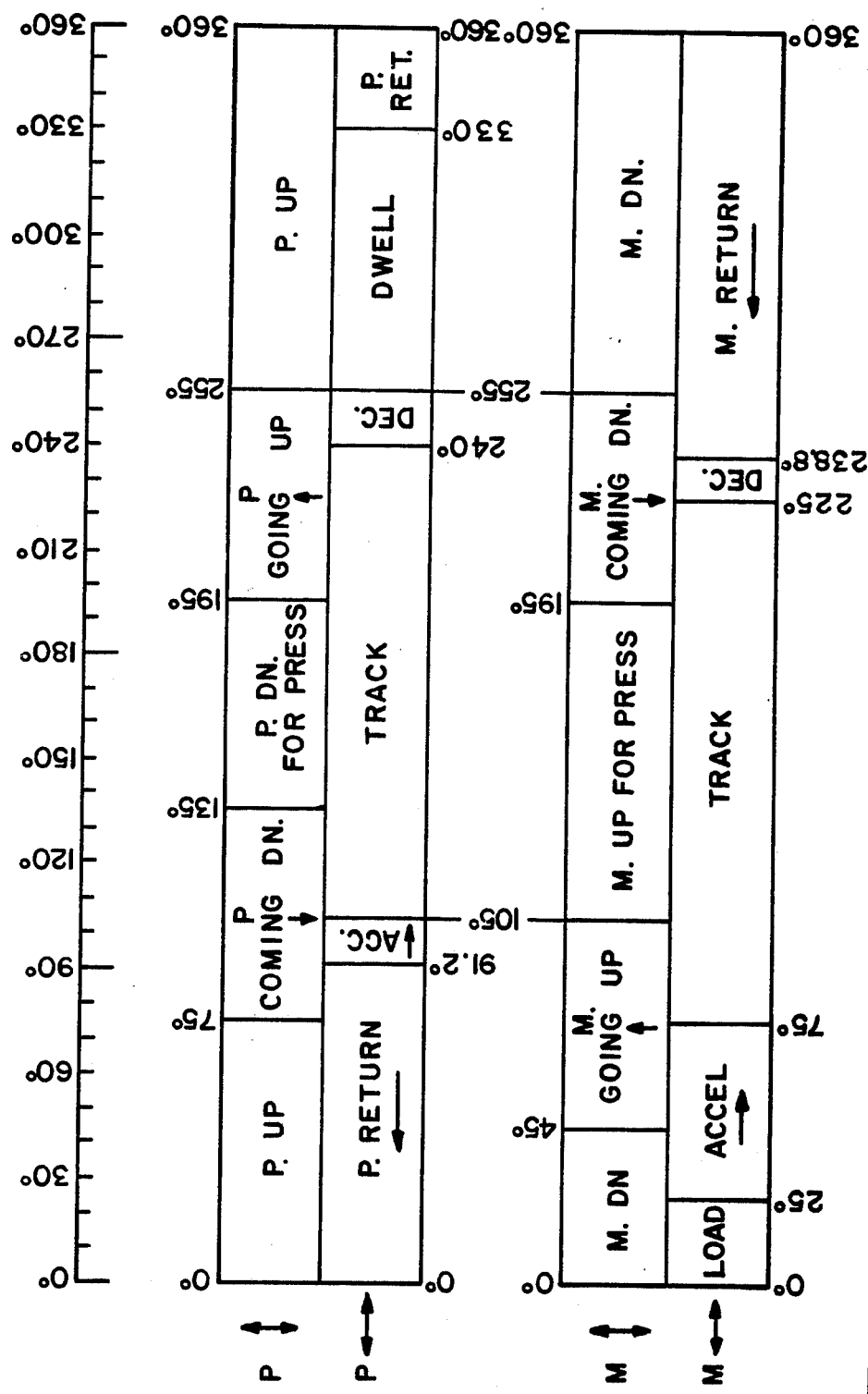
FIG. 6 is a timing chart illustrating the various movements of the mold and plunger set.

Between 195° and 255°, as shown in FIG. 6 in conjunction with FIG. 4, the plunger is moved from its downward pressing position to its full up position by means of third cam track 100, third cam follower 98, upper horizontal operating arm 94, crank arms 88,90, upper horizontal lift bar 102, and slide carriage 150, while simultaneously the mold is moved from its upward position for pressing to its lower most position by fourth cam track 120 through fourth cam follower 118, lower horizontal operating arm 114, crank arms 108,110, lower horizontal lift bar 122, and slide carriage 150. Further, as the mold M moves downwardly between 195° and 255°, the mold continues to track with the neck ring until it reaches 225° wherein it begins to decelerate, and continues deceleration to about 239°, wherein it begins its return toward the load position.

Accordingly, as fourth cam track 120 functions to lower the mold as previously described, second cam track 72 through the connecting linkage and lower slide rod 78 initially causes the mold to track the neck ring in an outward direction of travel of such neck ring, then decelerate to zero, and begin its reciprocal return toward the load position. In a similar manner, as the plunger is moving upwardly, it initially tracks the neck ring until reaching the 240° position, wherein it decelerates to the 255° position, at which point it reaches a dwell position. FIG. 5h discloses the 210° position showing the plunger moving in an upward direction and the mold moving in a downward direction while both are tracking with the neck ring. In FIG. 5i, the mold and plunger are shown at the 240° position wherein the plunger is moving upwardly from the neck ring while just beginning to decelerate, whereas the mold has begun its return movement while still moving in a downward direction.

Again as shown in FIG. 6, the plunger remains in the up position between the 255° position and the 360° position (zero position), whereas the mold remains in the down position during such time frame. Further, the plunger remains in a horizontal dwell position between 255° and 330° wherein it begins its reciprocal return movement in preparation for pressing association with the next presented neck ring. In a like manner, the mold is returned to the loading zone between about the 239° position and the 360° position (zero position) so as to receive a charge of molten glass and again repeat the pressing cycle in association with the next presented neck ring. As shown in the 270° position of FIG. 5j, the plunger is in an up dwell position with the neck ring moving onwardly along its lineal path, and the mold is in a down position returning toward the load position. FIG. 5k, which shows the 300° position, is similar to the 270° position, except that the neck ring N carrying the newly formed glass parison G has moved further along to make room for the next presented neck ring, and the mold has moved further along its return path. Finally, FIG. 5m, represents a 330° position wherein the plunger, while in its up position, is beginning its return motion in preparation of a new cycle, whereas the mold while still in its down position is continuing its return toward the loading position to also begin a new cycle with the next presented neck ring.

From the foregoing description of the various operations, it can be seen that the cam tracks 52, 72, 100 and 120, formed circumferentially about the outer surface of the timing drum cam 12, coordinate the motion of the mold and plunger so as to continuously cycle the mold and plunger about the paths or tracks MP and PT shown in FIG. 6a, so that the single mold set including mold M and plunger P function to press form a parison in successively presented neck rings continuously moving along a linear path within the vertical plane of operation of the mold and plunger. Thus, although the horizontal and vertical movements of the mold and plunger were separately described in connection with the mechanism shown in FIG. 4, it will be appreciated that virtually all of the movements are interrelated and that although the mold and plunger mounting means are clamped to their respective slide rods 78,58, the rollers 123 on slide carriage 150 for the mold and rollers 103 on slide carriage 150 for the plunger allow the mold and plunger to reciprocate back and forth along slide rods 78 and 58 while simultaneously being moved upwardly and downwardly as desired by horizontal lift bars 122 and 102, respectively. It will be understood, of course, that the timing chart of FIG. 6 is merely representative of one specific example, and that the timing desired for each rotation of the cam 12 will be dependent upon the desired rate of presentation and pitch diameter of the neck rings N. Further, although the mold and plunger mechanism of the present invention may be used with a variety of conveyor type forming apparatus such as shown in U.S. Pat. No. 3,622,305, a preferred embodiment is as set forth in our commonly owned copending application Ser. No. 120,353, entitled "Press and Blow Glass Forming", filed on even date.

Although I have set forth the now preferred embodiments of my invention, it will be apparent to those skilled in the art that various changes and modifications may be made thereto without departing from the spirit and scope thereof as set forth in the appended claims.

I claim:

1. A method of forming glass parisons with a single mold and plunger set for retention by a plurality of successively presented retention means, which comprises, continuously moving a plurality of retention means along a predetermined path, positioning a mold in an initial position vertically below said predetermined path, delivering a charge of molten glass to said mold, moving said mold in the direction of movement of said retention means at the same speed as that of said retention means so as to track vertically below one of said retention means, moving said mold vertically into operable engagement with said one retention means while continuing to track with the same, positioning a plunger vertically above said predetermined path for movement in the direction of said path, moving said plunger in the direction of movement of said retention means at the same speed as that of said retention means so as to track vertically above said one retention means simultaneously with the tracking of the mold with said retention means, moving said plunger vertically into operable pressing engagement with said one retention means while continuing to track with the same, pressing said charge of molten glass carried by said mold into a parison while said one retention means, said mold and said plunger move simultaneously along said predetermined path, vertically moving said mold and said plunger from operable engagement with said one retention means while simultaneously tracking with the same, retaining said newly press-formed parison with said retention means, moving said mold and plunger in a return direction opposite to the direction of movement of said retention means along said path to relative starting positions, and repeating the pressing cycle of said mold and plunger set with the next presented retention means.

2. A method of forming glass parisons as defined in claim 1 including the step of delivering a charge of molten glass to said mold while said mold is in an initial stationary position vertically below said one retention means.

3. A method of forming glass parisons as defined in claim 1 or 2 including the steps of accelerating said mold in a horizontal direction parallel to said predetermined path from said initial position to a speed which tracks with said one retention means, and during said acceleration simultaneously moving said mold upwardly toward said one retention means.

4. A method of forming glass parisons as defined in claim 1 including the steps of upon completion of the return movement of said plunger, accelerating said plunger in a horizontal direction parallel with said predetermined path to a speed so as to track with said one retention means, and moving said plunger downwardly toward said one retention means simultaneously with at least portions of the return, acceleration and tracking movements of said plunger.

5. A method of forming glass parisons as defined in claim 1 including the step of moving said mold into operable engagement with said one retention means prior to moving said plunger into operable pressing engagement with said one retention means.

6. A method of forming glass parisons as defined in claim 1 including the step of decelerating said mold and plunger after they have disengaged from said one retention means and simultaneously with a portion of the movement of said mold and plunger vertically away from said retention means.

7. A method of forming glass parisons as defined in claim 6 including the step of providing said plunger with a dwell period subsequent to decelerating said plunger and prior to moving the plunger in a return direction.

8. A method of forming glass parisons as defined in claim 1 including the step of moving said plunger and said mold solely within a common vertical plane passing through said predetermined path.

9. A method of forming glass parisons as defined in claim 1 or 8 including the step of continuously moving said mold and plunger in separate cyclic paths having a common boundary along a portion of said predetermined path.

10. A method of forming glass parisons as defined in claim 9 which includes the step of programming the vertical and horizontal movements of said mold and plunger to coordinate with the speed of travel of said retention means along said predetermined path.

11. A method of forming glass parisons as defined in claim 10 including the step of synchronously cam actuating said movements of said mold and plunger by providing a rotating single timing drum cam having a plurality of cam tracks formed thereon.

12. A method of repeatedly press forming a plurality of separate similar glass articles through the use of a single mold and plunger set cooperating with a plurality of continuously successively presented neck ring mechanisms which carry the newly formed articles away from the forming area, which comprises, continuously moving a plurality of neck ring mechanisms horizontally along a predetermined linear path, providing a mold vertically below said predetermined linear path, providing a plunger vertically above said predetermined linear path, moving said mold solely within a cyclical path lying within a vertical plane passing through said predetermined linear path, moving said plunger solely within a cyclical path also lying within said vertical plane passing through said predetermined linear path, positioning said cyclical paths within said vertical plane such that a portion of said mold cyclical path and a portion of said plunger cyclical path are virtually common with a portion of said predetermined linear path, supplying a charge of molten glass to said mold, moving said mold containing the charge of molten glass and said plunger through the common portion of said cyclical paths synchronously with a neck ring mechanism moving along said predetermined linear path and press forming said charge of molten glass into a glass article during such synchronous movement along said common portion of said paths, retracting said mold and plunger from said common portion and retaining the newly formed glass article in said neck ring mechanism for movement therewith away from said common portion, and continuing the movement of said mold and said plunger through their respective cyclical paths so as to press form a glass article in the next presented neck ring assembly horizontally moving along said predetermined linear path.

13. A method of press forming glass articles as defined in claim 12 including the step of moving said mold and plunger in both horizontal and vertical directions within said vertical plane.

14. A method of press forming glass articles as defined in claim 12 wherein said mold and plunger are moved in both a horizontal and vertical direction simultaneously during portions of their respective cyclical paths within said vertical plane.

15. A method of press forming glass articles as defined in claim 12 including the steps of passing said mold through a horizontal portion of its cyclical path vertically spaced apart from said common portion and in a direction counter to the direction of movement of said plurality of neck ring mechanisms along said predetermined linear path, and moving said plunger through a horizontal portion of its cyclical path vertically spaced apart from said common portion and in a direction counter to the direction of movement of said plurality of neck ring mechanisms along said predetermined linear path.

16. A method of repeatedly forming glass articles with a single mold and plunger set, which comprises, continuously moving a plurality of neck ring assemblies horizontally along a predetermined linear path, positioning a mold below said predetermined path, positioning a plunger above said predetermined path, delivering a charge of molten glass to said mold while in a loading position vertically spaced apart from said predetermined path, moving said mold horizontally and upwardly into operable engagement with one of said neck ring assemblies moving along said predetermined path, moving said plunger horizontally and downwardly into pressing engagement with said one neck ring assembly, synchronously moving said mold, plunger and neck ring along said predetermined linear path and press forming a glass article from said charge of molten glass, retracting said mold downwardly away from said neck ring and moving said mold back to said loading position, retracting said plunger upwardly away from said neck ring and moving it horizontally back to a starting position, retaining said article within said neck ring assembly and moving the same therewith along said path, and again delivering a charge of molten glass to the mold and moving the mold and plunger into operable engagement with the next presented neck ring assembly for press forming a glass article therein.

17. A method of forming glass articles as defined in claim 16 including the steps of moving said mold in a first cyclical path and moving said plunger in a second cyclical path with said cyclical paths lying within a vertical plane passing through said predetermined linear path.

18. Apparatus for press forming glass articles which comprises, a plurality of successively presented means continuously moving horizontally along a predetermined linear path for retaining and transporting a newly formed glass article, mold mounting means including a mold positioned below said predetermined path, plunger mounting means including a plunger positioned above said predetermined path, means for moving said mold in a cyclical path lying within a vertical plane passing through said predetermined linear path, means for moving said plunger in a cyclical path lying within said vertical plane passing through said predetermined linear path; said cyclical path through which said mold moving means moves said mold including a loading portion for receiving a charge of molten glass, a portion wherein said mold moves into operable engagement with a lower portion of one of said retaining means for synchronous movement therewith along a portion of said predetermined path, and a portion returning the mold back to said loading portion for repetition of the cycle with a next presented retaining means; said cyclical path through which said plunger moving means moves said plunger including a portion wherein the plunger moves into operable engagement with an upper portion of said one retaining means for synchronous travel therewith while simultaneously press forming a charge carried by said mold into a glass article retained by said retaining means, and a portion for returning said plunger back to a starting position for repetition of the pressing cycle with said next presented retaining means; and coordinating means for timing and coordinating the mold movement means and plunger movement means with the speed of movement of said plurality of retaining and transporting means.

19. Apparatus for press forming glass articles as defined in claim 18 wherein said means for moving said mold and said means for moving said plunger move said mold and said plunger in respective cyclical paths which have a portion thereof common with each other and a portion of said predetermined linear path.

20. Apparatus for forming glass articles as defined in claim 18 wherein said means for moving said mold and said means for moving said plunger move said mold and said plunger respectively simultaneously in both vertical and horizontal directions within said vertical plane.

21. Apparatus for press forming glass articles as defined in claim 18 wherein said coordinating means includes a rotatable timing drum cam, and said drum cam having a plurality of cam tracks formed circumferentially about the periphery thereof.

22. Apparatus for press forming glass articles as defined in claim 18 or 21 wherein said means for moving said plunger in a cyclical path includes first cam actuated horizontal slide means for reciprocally moving said plunger means in a horizontal direction, said first slide means including a first cam follower operably positioned within a first cam track formed on said coordinating means; and wherein said means for moving said mold in a cyclical path includes second cam actuated horizontal slide means for reciprocally moving said mold means in a horizontal direction, and said second slide means including a second cam follower operably positioned within a second cam track formed on said coordinating means adjacent said first cam track.

23. Apparatus for press forming glass articles as defined in claim 22 wherein said coordinating means is in the form of a timing drum cam rotatable about a horizontal axis, said first and second cam tracks are formed circumferentially about the periphery of said drum cam, and said first cam follower and said second cam follower reciprocally move longitudinally of said drum during the rotation thereof and have end points of their reciprocal travel lying within a vertical plane passing through the axis of said drum.

24. Apparatus for press forming glass articles as defined in claim 18 or 21 wherein said means for moving said plunger in a cyclical path includes first cam actuated vertical lift means for reciprocally moving said plunger means in a vertical direction, said first lift means including a third cam follower operably positioned within a third cam track formed on said coordinating means; and wherein said means for moving said mold in a cyclical path includes second cam actuated vertical lift means for reciprocally moving said mold means in a vertical direction, and said second lift means including a fourth cam follower operably positioned within a fourth cam track formed on said coordinating means adjacent said third cam track.

25. Apparatus for press forming glass articles as defined in claim 24 wherein said coordinating means is in the form of a timing drum cam rotatable about a horizontal axis, said third and fourth cam tracks are formed circumferentially about said drum cam, and said third cam follower and said fourth cam follower reciprocally move longitudinally of said drum during the rotation thereof and have end points of their reciprocal travel lying within a horizontal plane passing through the axis of said drum.

26. Apparatus for press forming glass articles as defined in claim 21 wherein said means for moving said plunger in a cyclical path includes first cam actuated horizontal slide means for reciprocally moving said plunger mounting means in a horizontal direction and first cam actuated vertical lift means for reciprocally moving said plunger mounting means in a vertical direction, said first slide means including a first cam follower operably positioned within a first of said plurality of cam tracks circumferentially positioned about the periphery of said rotatably timing drum cam, and said first lift means including a third cam follower operably positioned within a third of said plurality of cam tracks circumferentially positioned about the periphery of said drum cam.

27. Apparatus for press forming glass articles as defined in claim 26 wherein said cam actuated horizontal slide means includes a first cam follower arm carrying and operated by said first cam follower, an upper horizontal slide rod mounted for horizontal sliding movement, and connector means operatively connecting said first cam follower arm and said upper slide rod for reciprocating said slide rod in a linear horizontal direction in response to movement imparted by said first cam follower, and said plunger mounting means fixedly mounted on said upper slide rod for reciprocal horizontal movement therewith.

28. Apparatus for press forming glass articles as defined in claim 27 wherein said first cam actuated vertical lift means includes an upper horizontal operating arm carrying and operated by said third cam follower, an upper horizontal lift bar pivotally mounted at its opposite ends for vertical movement while remaining horizontal, and crank arm means operatively connecting said upper horizontal operating arm with said upper horizontal lift bar for oscillating said lift bar in a general vertical direction in response to movement imparted by said third cam follower, and a slide carriage member of said plunger mounting means operatively carried by said upper horizontal lift bar for vertical movement in response to vertical movement imparted to said upper lift bar by said third cam follower.

29. Apparatus for press forming glass articles as defined in claim 28 wherein said plunger mounting means includes a support bracket having a slide housing fixedly clamped to said upper horizontal slide rod for longitudinal horizontal movement therewith, said slide carriage member slidably mounted on said slide housing for vertical movement with respect thereto, said slide carriage member having a plurality of rollers engaging said upper horizontal lift bar for rolling movement therealong in response to movement imparted by said upper slide rod, said slide carriage member being moveable vertically with respect to said slide housing in response to vertical movement imparted by said upper lift bar, and said plunger being mounted on said slide carriage member.

30. Apparatus for press forming glass articles as defined in claim 29 wherein said plunger is movably mounted on said slide carriage member for limited vertical movement with respect thereto should excessive predetermined forces be exerted thereon, and plunger and cylinder means are mounted on said slide carriage member for retaining said plunger in predetermined position with respect to said slide carriage member and for facilitating vertical movement of said plunger relative to said carriage upon reaching said predetermined force to avoid catastrophic failure.

31. Apparatus for press forming glass articles as defined in claim 21 wherein said means for moving said mold in a cyclical path includes second cam actuated horizontal slide means for reciprocally moving said mold mounting means in a horizontal direction and second cam actuated vertical lift means for reciprocally moving said mold mounting means in a vertical direction, said second slide means including a second cam follower operably positioned within a second of said plurality of cam tracks circumferentially positioned about the periphery of said rotatable timing drum cam and said second lift means including a fourth cam follower operably positioned within a fourth of said plurality of cam tracks circumferentially positioned about the periphery of said drum cam.

32. Apparatus for press forming glass articles as defined in claim 31 wherein said second cam actuated horizontal slide means includes a second cam follower arm carrying and operated by said second cam follower, a lower horizontal slide rod mounted for horizontal sliding movement, and connector means operatively connecting said second cam follower arm and said lower slide rod for reciprocating said slide rod in a linear horizontal direction in response to movement imparted by said second cam follower, and said mold mounting means fixedly mounted on said lower slide rod for reciprocal horizontal movement therewith.

33. Apparatus for press forming glass articles as defined in claim 32 wherein said second cam actuated vertical lift means includes a lower horizontal operating arm carrying and operated by said fourth cam follower, a lower horizontal lift bar pivotally mounted at its opposite ends for vertical movement while remaining horizontal, and crank arm means operatively connecting said lower horizontal operating arm with said lower horizontal lift bar for oscillating said lift bar in a general vertical direction in response to movement imparted by said fourth cam follower, and a slide carriage member of said mold mounting means operatively carried by said lower horizontal lift bar for vertical movement in response to vertical movement imparted to said lower lift bar by said fourth cam follower.

34. Apparatus for press forming glass articles as defined in claim 33 wherein said mold mounting means includes a support bracket having a slide housing fixedly clamped to said lower horizontal slide rod for longitudinal horizontal movement therewith, said slide carriage member slidably mounted on said slide housing for vertical movement with respect thereto, said slide carriage member having a plurality of rollers engaging said lower horizontal lift bar for rolling movement therealong in response to movement imparted by said lower slide rod, said slide carriage member being moveable vertically with respect to said slide housing in response to vertical movement imparted by said lower lift bar, and said mold being mounted on said slide carriage member.

35. Apparatus for press forming glass articles as defined in claim 34 wherein said mold is movably mounted on said slide carriage member for limited vertical movement with respect thereto should excessive predetermined forces be exerted thereon, and plunger and cylinder means are mounted on said slide carriage member for retaining said mold in predetermined position with respect to said slide carriage member and for facilitating vertical movement of said mold relative to said carriage upon reaching said predetermined force to avoid catastrophic failure.

36. Apparatus for forming glass articles which comprises, means for continuously moving a plurality of neck ring assemblies horizontally along a predetermined linear path, a single mold positioned below said linear path, a single plunger positioned above said linear path, means for moving said mold and said plunger into operable pressing engagement with each neck ring assembly successively presented along said path for press forming a glass article therewithin during continuous movement along said path from a charge of molten glass delivered to said mold, and said means for moving said mold and said plunger including cam actuated means programming the vertical and horizontal movement of said mold and said plunger for operable synchronous tracking engagement with each successively presented continuously moving neck ring assembly.

37. Apparatus for forming glass articles as defined in claim 36 wherein a timing drum cam having a plurality of cam tracks circumferentially formed about an outer surface thereof synchronizes and actuates said cam actuated means.

38. Apparatus for forming glass articles as defined in claim 36 or 37 wherein said cam actuated means includes a plurality of pivotally connected means for moving said mold in both a horizontal and vertical direction solely within a vertical plane passing through said linear path and a plurality of pivotally connected means for moving said plunger in both a vertical and horizontal direction solely within said vertical plane.

39. Apparatus for forming glass articles as defined in claim 36 wherein said cam actuated means is actuated by a single timing drum cam having a plurality of four cam tracks formed circumferentially about the outer periphery thereof, a first of said cam tracks programming the horizontal movement of said plunger, a second of said cam tracks programming the horizontal movement of said mold, a third of said cam tracks programming the vertical movement of said plunger, and a fourth of said cam tracks programming the vertical movement of said mold, such that said mold and said plunger synchronously track in pressing engagement with successively presented neck ring assemblies.

40. Apparatus for forming glass articles as defined in claim 39 wherein said first and third cam tracks function to move said plunger through a cyclical path having a portion common with said linear path, and said second and fourth cam tracks function to move said mold through a cyclical path also having a portion common with said linear path.

41. Apparatus for forming glass articles as defined in claim 40 wherein said cyclical paths lie within a single vertical plane passing through said linear path.

* * * * *